(12) United States Patent
Jung (10) Patent No.: US 11,741,341 B2
(45) Date of Patent: Aug. 29, 2023

(54) METHOD AND SYSTEM FOR SEMI-SUPERVISED ANOMALY DETECTION WITH FEED-FORWARD NEURAL NETWORK FOR HIGH-DIMENSIONAL SENSOR DATA

(71) Applicant: Palo Alto Research Center Incorporated, Palo Alto, CA (US)

(72) Inventor: Deokwoo Jung, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 325 days.

(21) Appl. No.: 16/593,248

(22) Filed: Oct. 4, 2019

(65) Prior Publication Data
US 2021/0103794 A1    Apr. 8, 2021

(51) Int. Cl.
G06N 20/00    (2019.01)
*G06N 3/042*    (2023.01)
*G06N 3/08*    (2023.01)
*G06N 3/045*    (2023.01)
*G06N 7/01*    (2023.01)

(52) U.S. Cl.
CPC ............. *G06N 3/042* (2023.01); *G06N 3/045* (2023.01); *G06N 3/08* (2013.01); *G06N 7/01* (2023.01); *G06N 20/00* (2019.01)

(58) Field of Classification Search
CPC .... G06N 3/0427; G06N 20/00; G06N 3/0454; G06N 3/08; G06N 7/005
See application file for complete search history.

(56) References Cited

U.S. PATENT DOCUMENTS

| 2016/0285700 | A1* | 9/2016 | Gopalakrishnan | ...... H04L 41/16 |
| 2017/0024649 | A1* | 1/2017 | Yan | ...... G06N 3/0454 |
| 2019/0287005 | A1* | 9/2019 | Subramaniyan | ........ G06F 30/20 |

FOREIGN PATENT DOCUMENTS

WO    WO2105/160367 A1 *    4/2014    ............. H04L 12/22

OTHER PUBLICATIONS

Huda, S., et al, Defending unknown attacks on cyber-physical systems by semi-supervised approach and available unlabeled data [online] [retrieved Sep. 24, 2021] Retrieved from Internet:<https://www.sciencedirect.com/science/article/pii/S0020025516309380>(Year: 2016).*

(Continued)

*Primary Examiner* — Miranda M Huang
*Assistant Examiner* — Bart I Rylander
(74) *Attorney, Agent, or Firm* — Shun Yao; YAO LEGAL SERVICES, INC.

(57) ABSTRACT

One embodiment can provide a system for detecting anomaly for high-dimensional sensor data associated with one or more machines. During operation, the system can obtain sensor data from a set of sensor associated with one or machines, generate a first set of outputs by using a set of clustering models learned in parallel from the unlabeled sensor data and user-provided partial label information, generate a second set of outputs by using a set of feed-forward neural network (FNN) models learned in parallel from the first set of outputs and the unlabeled sensor data, and determine whether an anomaly is present in the operation of the one or more machines based on the second set of outputs and a user-specified threshold.

14 Claims, 9 Drawing Sheets

(56) References Cited

OTHER PUBLICATIONS

Keshk, M., et al, An Integrated Framework for Privacy-Preserving Based Anomaly Detection for Cyber-Physical Systems [online][retrieved Sep. 24, 2021].Published Mar. 2019. Retrieved from Internet:< https://ieeexplore.ieee.org/abstract/document/8673653> (Year: 2019).*

Kravchik, M., et al, Detecting Cyber Attacks in Industrial Control Systems Using Convolutional Neural Networks, [online] [retrieved Sep. 24, 2021], Retrieved from Internet:<https://dl.acm.org/doi/abs/10.1145/3264888.3264896> (Year: 2018).*

Goh, J., et al, Anomaly Detection in Cyber Physical Systems using Recurrent Neural Networks, [online] [retrieved Sep. 24, 2021] Retrieved from Internet:<https://ieeexplore.ieee.org/abstract/document/7911887> (Year: 2017).*

Zong, B., et al, Deep Autoencoding Gaussian Mixture Model for Unsupervised Anomaly Detection, [online] [retrieved Sep. 24, 2021]. Retrieved from Internet:<https://openreview.net/forum?id=BJJLHbb0-> (Year: 2018).*

Keshk, M. et al, An Integrated Framework for Privacy-Preserving Based Anomaly Detection for Cyber-Physical Systems, [retrieved Apr. 8, 2022]. Retrieved from Internet:<https://ieeexplore.ieee.org/abstract/document/8673653> (Year: 2019).*

Huda, S. et al, Defending unknown attacks on cyber-physical systems by semi-supervised approach and available unlabeled data, [retrieved Apr. 8, 2022]. Retrieved from Internet:<https://www.sciencedirect.com/science/article/pii/S0020025516309380> (Year: 2017).*

Collell, G., et al, A simple plug-in bagging ensemble based on threshold-moving for classifying binary and multiclass imbalanced data, [retrieved Jul. 29, 2022]. Retrieved from Internet:<https://www.sciencedirect.com/science/article/pii/S092523121731456X> (Year: 2017).*

Gulati, N., et al, GMM based Semi-Supervised Learning for Channel-based Authentication Scheme, [retrieved Jan. 6, 2023]. Retrieved from Internet:<https://ieeexplore.ieee.org/abstract/document/6692216> (Year: 2013).*

Emmott, A., et al, Systematic Construction of Anomaly Detection Benchmarks from Real Data, [retrieved on May 3, 2023]. Retrieved from Internet:<https://dl.acm.org/doi/abs/10.1145/2500853.2500858> (Year: 2013).*

\* cited by examiner

1) Input Data:
   sensor data : $X = (x_1, \cdots, X_N), X_n = (\chi_{n1}, \cdots, \chi_{np})$
   user input ; $Y_h = (y_{i1}, \cdots, y_{im})$ 2) Random Initialization:
   $r^0_{nk} \sim U(0,1) \; \forall n = 1 \cdots N, k = 1 \cdots K$
   $r^0_{nk} \leftarrow r^0_{nk} / \sum_{k=0}^{K} r^0_{nk}$
   $\pi^0_k \leftarrow \frac{1}{K}$ 3) Expectation Step:
   $R^t_n \leftarrow \sum_{k=0}^{K} N(x_n; u^t_k, \sum^t_k) \pi^t_k,$
   $r^t_n \leftarrow \frac{1}{R^t_n} N(x_n; u^t_k, \sum^t_k) \pi^t_k$ 4) User Input Update Step:
   $r^t_{nk} \leftarrow 1 \text{ if } k = y_n, \text{ else } r^t_{nk} \leftarrow 0 \, \forall n = i_1 \cdots i_m$ 5) Maximization Step:
   $N^t_k \leftarrow \sum_{n=1}^{N} r^t_{nk}$
   $\pi^{t+1}_k \leftarrow \frac{1}{N^t_k} \sum_{n=1}^{N} r^t_{nk}$
   $u^{t+1}_k \leftarrow \frac{1}{N^t_k} \sum_{n=1}^{N} r^t_{nk} \chi_{ni}$
   $\sum^{t+1}_{kij} \leftarrow \frac{1}{N^t_k} \sum_{n=1}^{N} r^t_{nk} (\chi_{ni} - u^{t+1}_k)(\chi_{nj} - u^{t+1}_{kj})$ 6) Evaluation:
   $LLH^{t+1} \leftarrow \sum_{n=1}^{N} \ln p(x_n | \theta^{t+1})$

*FIG. 3A*

1) Random Parameter Initialization:
   Run Step 2 and Step 5 in FIG. 3A

2) Expectation - Maximization Update:
   Run Step 3,4,5 in FIG. 3A

3) Convergence Text
   Run Step 6 in FIG. 3A
   Terminate if $LLH^t - LLH^{t-1} < tol$.
   Go back to 2) else

| Models | | DATA SET 1 | DATA SET 2 | DATA SET 3 | DATA SET 4 | DATA SET 5 |
|---|---|---|---|---|---|---|
| 5GMM-1FNN without label | Estimated Label, $q$ | 0.43 | 0.67 | 0.77 | 0.95 | 0.56 |
| | Anomaly Score, $\hat{Z}_t$ | 0.47 | 0.68 | 0.89 | 0.97 | 0.49 |
| 5GMM-1FNN with 5% Normal label | Estimated Label, $q$ | 0.93 | 0.97 | 0.76 | 0.96 | 0.86 |
| | Anomaly Score, $\hat{Z}_t$ | 0.99 | 0.99 | 0.90 | 0.96 | 0.92 |
| iForest | Average Score | 0.47 | 0.73 | 0.60 | 0.74 | 0.70 |

METHOD AND SYSTEM FOR SEMI-SUPERVISED ANOMALY DETECTION WITH FEED-FORWARD NEURAL NETWORK FOR HIGH-DIMENSIONAL SENSOR DATA

BACKGROUND

Field

This disclosure is generally related to a system and method for anomaly detection in operation of industrial machines or systems. More specifically, this disclosure is related to detection of anomaly in high-dimensional sensor data.

Related Art

With the increasing use of Internet of Things (IoT) enabled equipments in numerous industrial applications, e.g., digital manufacturing, a large amount of sensor data is readily available. In particular, in many Cyber Physical System (CPS) applications, sensor data is continuously generated from IoT equipped devices. Detecting anomaly events using the available sensor data is a valuable task for planning, diagnostics, and prognostics. However, in CPS applications, labeled datasets are rarely available or expensive to be obtained. In other words, there is no apriori knowledge about which points are normal or abnormal. As a result, few or no labels are available for sensor data in real-world applications.

Unlike other conventional data, e.g., text, image, and voice, acquiring labeled sensor data is difficult in many CPS applications. Another reason for the difficulty of obtaining labeled sensor data is that the complexity of an application-specific system allows only few experts in the application to assign labels to the sensor data. Furthermore, an abnormal event rarely occurs compared with a normal event which causes a large label-imbalance problem for training data sets.

The above-mentioned problems make it difficult to use supervised learning approaches for anomaly detection in CPS applications. Therefore, to make anomaly detection methods scale well to real-world applications, the anomaly detection method needs to learn models from the unlabeled sensor data and user-provided partial label information.

SUMMARY

According to one embodiment of the present invention, a system for detecting anomalies for high-dimensional senor data associated with one or more machines is provided. During operation, the system can obtain sensor data from a set of sensors associated with one or machines, generate a first set of outputs by using a set of clustering models learned in parallel from the unlabeled sensor data and user-provided partial label information, generate a second set of outputs by using a set of feed-forward neural network (FNN) models learned in parallel from the first set of outputs and the unlabeled sensor data, and determine whether an anomaly is present in the operation of the one or more machines based on the second set of outputs and a user-specified threshold In a variation on this embodiment, pre-processing the sensor data prior to generating the first set of outputs.

In a variation on this embodiment, the first set of outputs include a set of labels.

In a variation on this embodiment, each label in the set of labels is: a normal label; or an abnormal label.

In a variation on this embodiment, at least one clustering model in the set of clustering models includes a Gaussian Mixture Model (GMM).

In a variation on this embodiment, the user-provided partial label information includes a set of normal labels.

In a further variation on this embodiment, generating the first set of outputs further comprises: training the set of clustering models with the unlabeled sensor data to generate an initial set of outputs, wherein each output in the initial set of outputs is associated with each clustering model in the set of clustering models; computing a set of weights associated with the set of clustering models by using the user-provided partial label information and the initial set of outputs; using the set of weights and the initial set of outputs to compute a set of abnormal label probabilities; and generating the first set of outputs by applying a Bernoulli random sample generator to the set of abnormal label probabilities.

In a further variation on this embodiment, determining whether an anomaly occurs further comprises: computing an average for each sample across the second set of outputs associated the set of FNN models; and detecting an anomaly when the average for each sample is greater than the user-specified threshold.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the technical problem of detecting anomalies in operation of industrial machines. More specifically, an anomaly-monitoring-and-detection system can obtain unlabeled sensor data from sensors embedded in the machines and preprocess the sensor data. The system then incrementally learns anomaly models from unlabeled high-dimensional sensor data with a few normal labels provided by users.

In some embodiments of the present invention, the system uses a mixture of generative and discriminative model for generating labels and building a classifier, respectively. The generative model can re-sample labels to train the discriminative model for performing a binary classification of normal or abnormal states. In other words, the system can generate initial labels by using an ensemble Gaussian Mixture models (GMMs) learned from the unlabeled sensor data. The system can also generate probabilistic (soft) labels using the GMM ensemble, weighted by partial label information provided by users, to train an ensemble of Feed Forward Neural Networks (FNN). The system can then detect anomalies in the operation of the machines by applying a user-defined threshold to average of the FNNs outputs.

Semi-Supervised Anomaly Detection System Architecture

Figure 1:
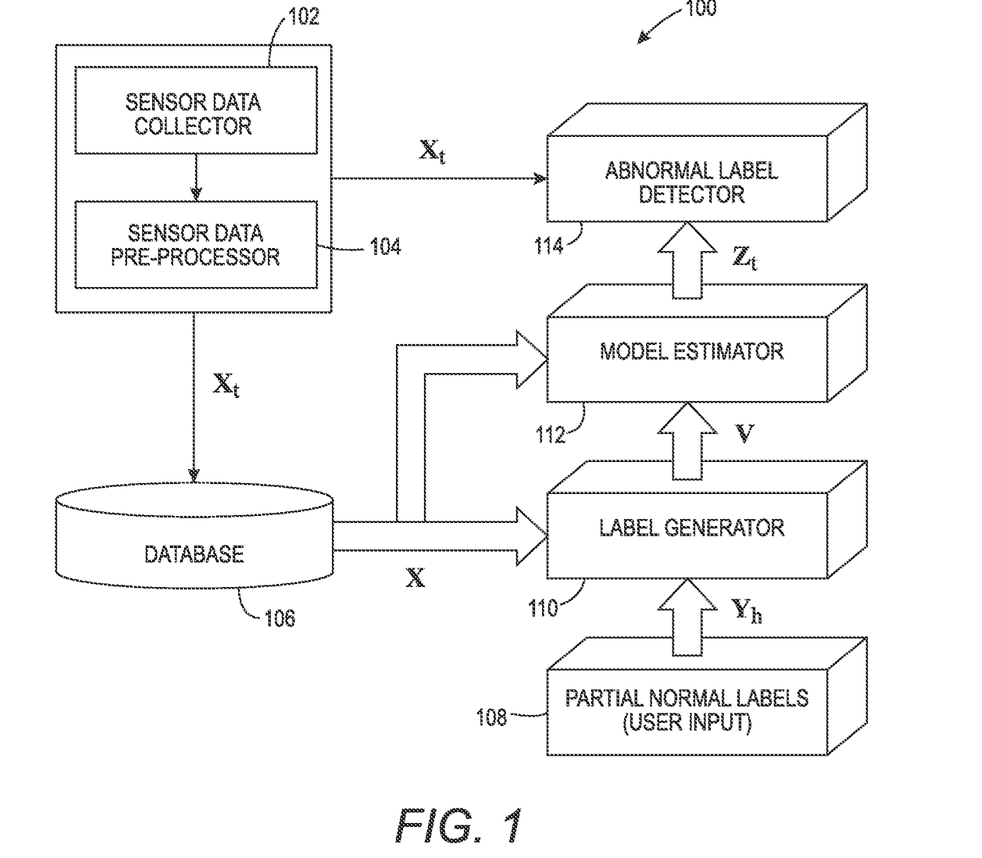
FIG. 1 shows an exemplary semi-supervised anomaly detection data flow architecture, according to one embodiment of the present invention.

FIG. 1 shows an exemplary semi-supervised anomaly detection data flow architecture, according to one embodiment of the present invention. The semi-supervised anomaly detection data flow architecture, can include a sensor data collector 102, a sensor data pre-processor 104, a sensor database 106, an user input 108 including partial normal labels, a label generator 110, a model estimator 112, and an abnormal label detector 114.

Sensor data collector 102 collects sensor data from a set of sensors embedded in one or more machines. Sensor data pre-processor 104 can pre-process the collected sensor data by normalizing the collected sensor data to have zero-mean and unit-variance. Time samples of the pre-processed sensor data $x_t$ can be stored in database 106 for further processing. In some embodiments of the present invention, the system can send the normalized sensor data to another computer system implementing label generator 110 to generate estimated labels V. The normalized sensor data includes unlabeled sensor data X.

Label generator 110 can build a set of clustering models using the unlabeled sensor data X to generate an initial set of label outputs. In one embodiment of the present invention, a Gaussian mixture model (GMM) is used as a clustering model. The initial set of label outputs can include normal labels and/or abnormal labels. Label generator 110, can in addition to building a set of clustering models, estimate a Bernoulli probability for each sample using the initial set of label outputs generated from the clustering models and partial normal labels $Y_h$ provided by user input 108. The Bernoulli probability can be interpreted as a probabilistic soft label of a sample. Label generator 110 can then generate a set of estimated labels V.

Model estimator 112 can build a set of FNN models by using the unlabeled sensor data X and the set of estimated labels V. Model estimator 112 can generate a set of predicted label outputs, with each predicted label sample for all outputs denoted as $z_t$. The system can then perform anomaly detection by using anomaly detector 114. Anomaly detector 114 can detect an anomaly by computing an average of the set of predicted label outputs for each sample. The system then applies user-specified threshold to this computed average to detect an anomaly.

Figure 2:
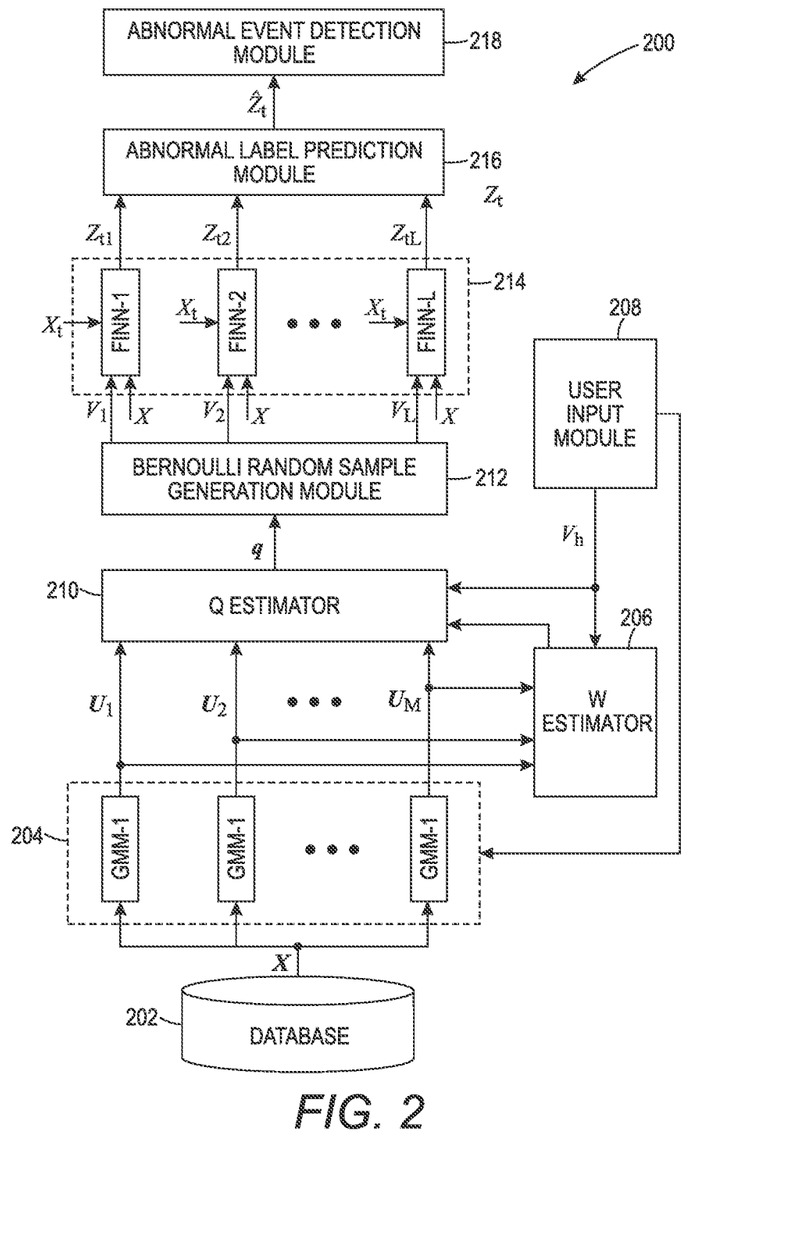
FIG. 2 shows an exemplary semi-supervised anomaly detection system architecture, according to one embodiment of the present invention.

FIG. 2 shows an exemplary semi-supervised anomaly detection system architecture, according to one embodiment of the present invention. In this example, a semi-supervised anomaly detection system 200 provides architectural details of label generator 110, model estimator 112 and abnormal detector 114 shown in FIG. 1. Semi-supervised anomaly detection system 200 can include a database 202, a GMM model estimator 204, a W estimator 206, an user input module 208, a Q estimator, 210, a Bernoulli random sample generation module 212, a FNN model estimator 214, an anomaly label prediction module 216, and an abnormal event detection module 218.

The following simplified notations for a matrix are used for describing the operation of different elements in the semi-supervised anomaly detection system 200. For an n×m matrix, $A=[a_{ij}]_{nm}$, an $i^{th}$ row vector and a $j^{th}$ column vector are denoted by $A_i$ and $A_j$ respectively, where $1 \leq i \leq n$ and $1 \leq j \leq m$.

Database 202 stores the pre-processed sensor data collected from a set of sensors embedded in one or more machines. The system can pre-process the collected sensor data by normalizing the collected sensor data to have zero-mean and unit-variance. Let the set of sensors corresponding to p feature sensors with n samples each represent certain unknown states of a system of interest. In other words, the sensor data include unlabeled sensor data. Let X denote a normalized feature matrix defined by $X=[x_{ij}]_{np}$, where $x_{ij}$ represents the $i^{th}$ sample of the $j^{th}$ feature sensor for $1 \leq i \leq n$. The column vector $X_j=[x_{1j}, x_{2j}, \ldots, x_{nj}]$ represents data from $j^{th}$ feature sensor. Since all the sensor data are normalized, their variance is $Var[X_j]=1$ and mean is $E[X_j]=0$.

Figure 3A:
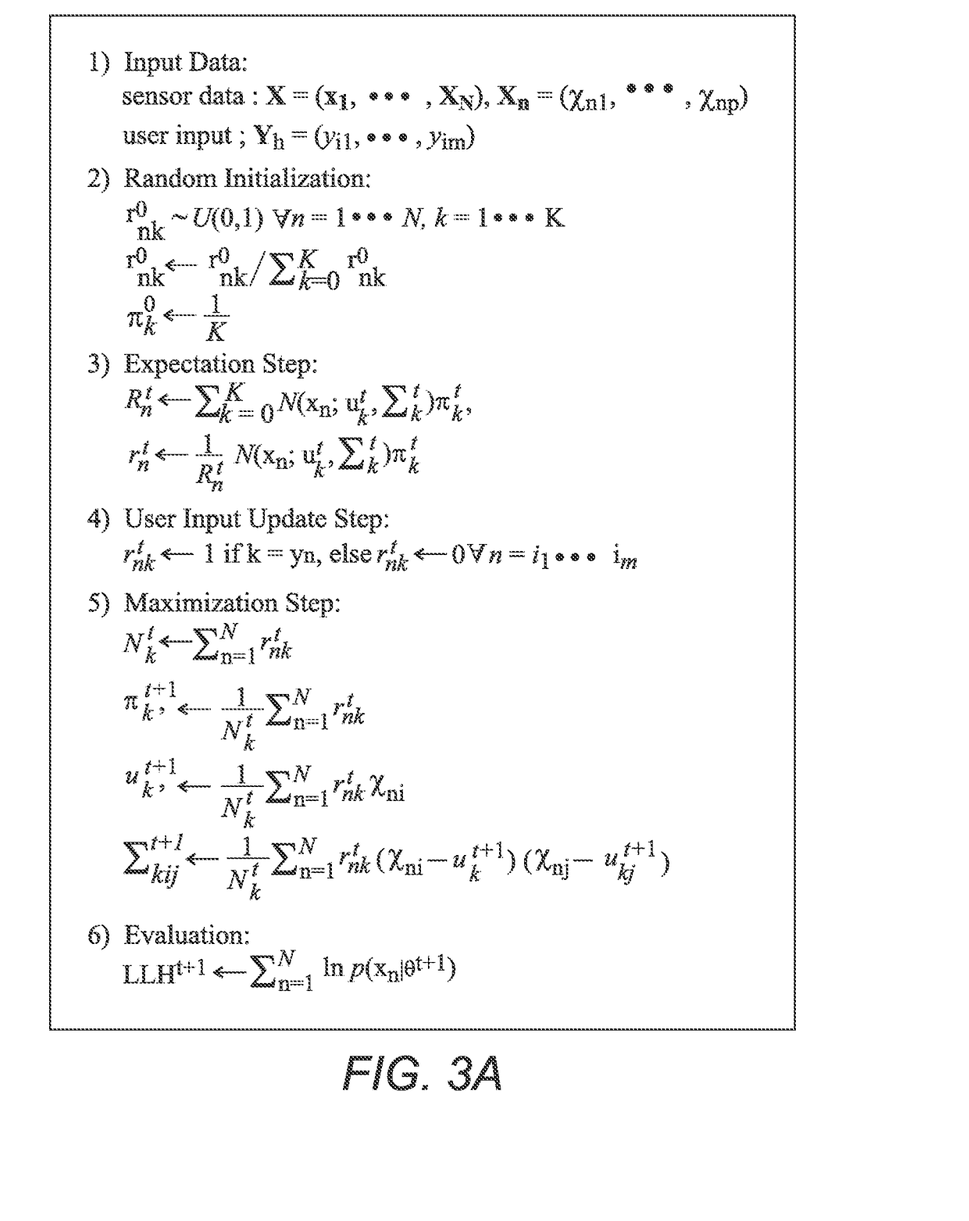
FIG. 3A shows the pseudocode for different computation steps in a Semi-Supervised Expectation Maximization algorithm for a Gaussian Mixture Model, according to one embodiment of the present invention.
Figure 3B:
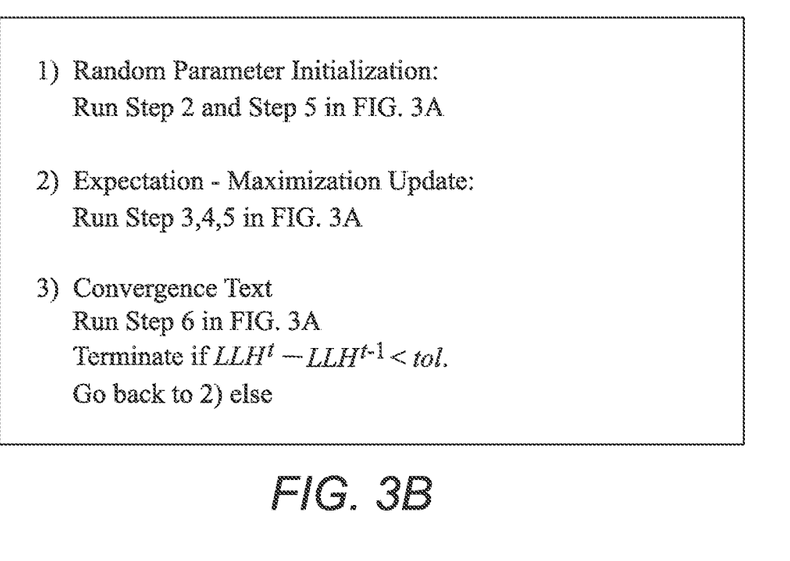
FIG. 3B shows the pseudocode for Semi-Supervised Expectation Maximization algorithm, according to one embodiment of the present invention.

GMM model estimator 204 trains M randomly initialized clustering models, e.g., GMMs, in parallel from a set of sub-matrix X to generate an initial label hypothesis independently for each model. The system builds the GMMs by using the following formulations. Let x denote a random variable and a multivariate Gaussian distribution of the random variable be given by: $N(x|\mu_k, \Sigma_k)$ with a 1×p mean vector $\mu_k$ and a p×p covariance matrix $\Sigma_k$ for $k^{th}$ cluster. Accordingly, a probability density function of the GMM with K centroids can be determined by:

$$g(x) = \sum_{1 \leq k \leq K} \pi_k N\left(x | \mu_k, \Sigma_k\right) \quad (1)$$

where $\pi_k$ represents a weight probability with $0 \leq \pi_k \leq 1$ and $\Sigma_k \pi_k = 1$. Let $\Theta=[(\pi_k, \mu_k, \Sigma_k)]_{k=1, \ldots, K}$ denote a GMM parameter. The system can train the GMM models to compute the GMM parameter, $\Theta$, by using training data X and user-provided normal labels, $Y_h$. The GMMs can be trained by using a Semi-Supervised Expectation Maximization (SSEM) algorithm. The SSEM algorithm includes a user input update step and represents a modified version of a standard Expectation Maximization algorithm. FIG. 3A shows the pseudocode for different computation steps in a Semi-Supervised Expectation Maximization algorithm for a Gaussian Mixture Model, according to one embodiment of the present invention. FIG. 3B shows the pseudocode for Semi-Supervised Expectation Maximization algorithm, according to one embodiment of the present invention.

In one embodiment of the present invention, the system can estimate the state (i.e., the label) based on the observed sensor measurements $x_*$ by computing $k_*$:

$$k_* = \operatorname*{argmax}_{k} \pi_k N\left(x_* \mid \mu_k, \underset{k}{\Sigma}\right) \quad (2)$$

For example, when the system performs anomaly detection, the number of clusters can be set to 2, i.e., K=2. A cluster with a smaller weight matrix, $\pi_k$, can be assigned to an anomaly class, e.g., cluster 1 can be an anomaly class if $\pi_1 < \pi_2$.

Given X and $Y_h$, the GMM parameter, $\Theta$, may randomly converge to one of many local optimal parameters, thereby resulting in a large number of possible GMM hypothesis. The system finds M hypothesis or estimated labels $\{u_m | m=1, 2, \ldots, M\}$, by training M GMMs in parallel, where $u_m$ denotes labels from $m^{th}$ GMM.

W estimator 206 computes weights W for each GMM's label $u_m$. The W estimator can be used for evaluating a reliability of each GMM by using user-provided normal labels $Y_h$, which can be provided by a user via user input module 208. Let y denote ground truth labels, where each sample $y_n \in \{0,1\}$. Let $Y_h$ denote the index of normal labels in y provided by users, where $y_n = 0, \forall n \in Y_h$. The system can compute the weights W as follows:

$$w'_m \sum_{n \in Y_h} I(y_n, u_{mn})/\|Y_h\| \quad (3)$$

$$W = [w'_1, w'_2, \ldots, w'_M] / \sum_m w'_m \quad (4)$$

where $l(x,y)$ is an identity function with output 1 if x=y, and 0 otherwise; and $\|x\|$ is the cardinality of x.

Q estimator 210 computes abnormal probability q by computing a weighted average of labels $\{u_1, u_2, \ldots, u_M\}$ by applying the weights W. In one embodiment, the system can compute the abnormal probability $q=(q_1, q_2, \ldots, q_N)$ as:

$$q=(UW^T) \circ 1_h \quad (5)$$

where U is a matrix of GMM labels $\{u_1, u_2, \ldots, u_M\}$, $\circ$ is a Hadamard product, and $1_h$ is a N×1 binary matrix, where $1_h[n]=0$ for $n \in Y_h$ and 1 otherwise.

Bernoulli random sample generation module 212 can generate a set of Bernoulli random labels $\{v_1, v_2, \ldots, v_L\}$ from the abnormal probability q:

$$v_{nl} \sim \text{Bern}(q_n) \quad (6)$$

In one embodiment, the Bernoulli random labels can be used as training labels for $n^{th}$ sample in $l^{th}$ FNN model in the FNN model estimator 214.

FNN model estimator 214 can use a back propagation algorithm to create an ensemble of FNN models trained from labeled sensor data $(X, v_l)$ where $v_l$ represents the Bernoulli random labels for the $l^{th}$ FNN model. The system can train L FNN models in parallel with their respective training data set $(X, v_l)$ and observed sensor data $x_t$ to generate a set of predicted labels $\{z_{t1}, z_{t2}, \ldots, z_{tL}\}$.

Anomaly label prediction module 216 can output a final abnormal score $\hat{z}_t$ by computing an average of the FNN model estimator 214 outputs $\{z_{t1}, z_{t2}, \ldots, z_{tL}\}$, where $0 \leq \hat{z}_t \leq 1$. Abnormal event detection module 218 can detect abnormal events from each sample, which is defined by:

$$s_t = \begin{cases} 0, & \text{normal} \quad \text{if } \hat{z}_t \leq z_{th} \\ 1, & \text{abnormal} \quad \text{if } \hat{z}_t > z_{th} \end{cases} \quad (15)$$

where $s_t$ represents a state of each sample and $0 \leq z_{th} \leq 1$ is a user-defined threshold.

Figure 4A:
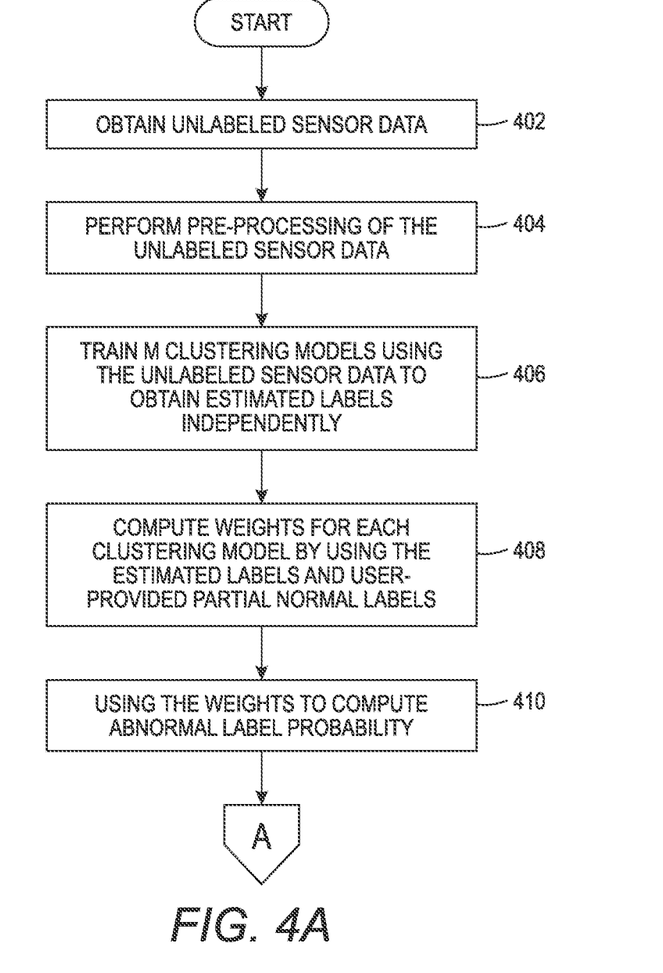
FIG. 4A presents a flowchart illustrating an exemplary process for performing semi-supervised anomaly detection with a feed-forward neural network, according to one embodiment of the present invention.

FIG. 4A presents a flowchart illustrating an exemplary process for performing semi-supervised anomaly detection with a feed-forward neural network, according to one embodiment of the present invention. During operation, the system may obtain unlabeled high-dimensional sensor data stored in a sensor database (operation 402). The sensor data is associated with a plurality of sensors embedded in one or more machines in a factory layout.

The system can pre-process the unlabeled sensor data to provide normalized unlabeled sensor data with zero-mean and unit-variance (operation 404). Subsequent to performing sensor data pre-processing, the system can build a set of clustering models, e.g., GMMs. In other words, the system can use the unlabeled sensor data to train a set of M clustering models to generate an initial set of normal and/or abnormal labels independently (operation 406).

In one embodiment of the present invention, the system can compute weights for each clustering model by using the initial set of labels and user-provided partial normal labels (operation 408). These weights represent reliability of each GMM model in the semi-supervised anomaly detection process. The system then uses these weights to compute an abnormal label probability (operation 410).

Figure 4B:
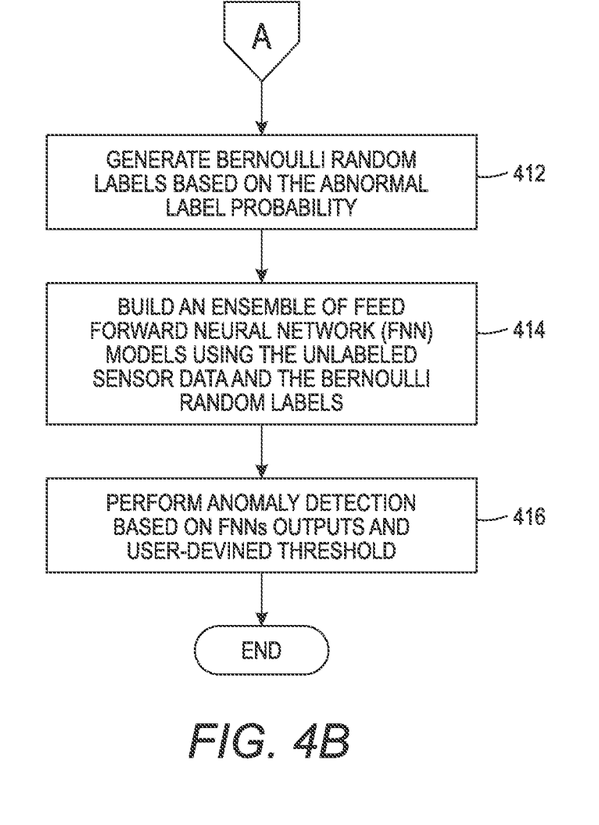
FIG. 4B presents a continuation of flowchart in FIG. 4A, illustrating an exemplary process for performing semi-supervised anomaly detection with feed-forward neural network, according to one embodiment of the present invention.

FIG. 4B presents a continuation of flowchart in FIG. 4A, illustrating an exemplary process for performing semi-supervised anomaly detection with a feed-forward neural network, according to one embodiment of the present invention. The system subsequently generates the Bernoulli random labels by using the abnormal label probability (operation 412). Each of these Bernoulli random labels can be interpreted as a probabilistic soft label of a sample.

The system then uses the Bernoulli random labels and the unlabeled sensor data to build an ensemble of FNN models. Net the system outputs a set of predicted labels for the ensemble of the FNN models (operation 414). Finally, a collective decision is made for an anomaly by computing an average of the FNN outputs. The system then applies a user-defined threshold to the computed average value for each sample to detect an anomaly (operation 416).

Figure 5:
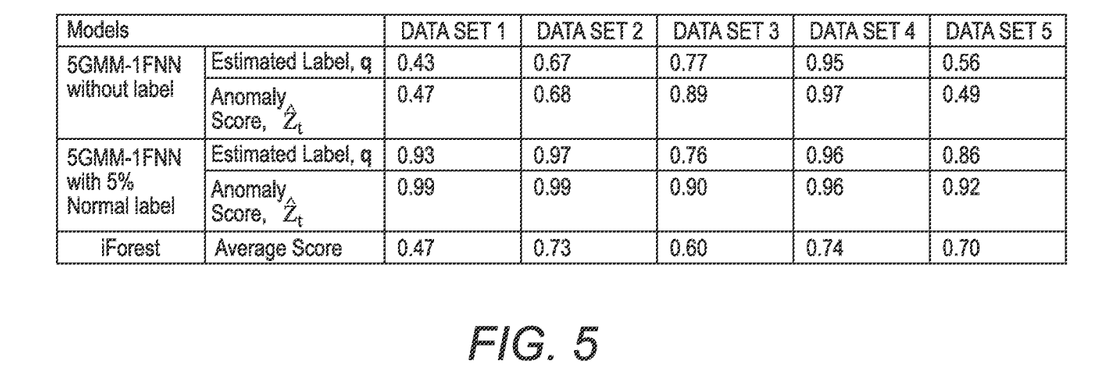
FIG. 5 shows experimental results, according to one embodiment of the present invention.

FIG. 5 shows experimental results, according to one embodiment of the present invention. For evaluating the performance of the anomaly detection process presented in FIG. 4A and FIG. 4B, two different experiments have been performed on 5 different data sets. In the first experiment, 5 GMM ensemble and one FNN were generated without normal label inputs. In the second experiment, the 5 GMM ensemble and one FNN were generated with 5% normal label input. In both the experiments an Area Under Curve (AUC) metric has been used to evaluate the performance of the anomaly detection process. In both the experiments an average AUC has been computed for the final anomaly score $\hat{z}_t$ and for an estimated label q generated by the 5 GMM ensemble. FIG. 5 shows that by using a normal label input of 5% a significant AUC gain over the experiment without normal label input can be obtained. Further, a comparison of the AUC values for the final anomaly score $\hat{z}_t$ and the estimated label q, depicts that there is a significant AUC gain by using the FNN ensemble. FIG. 5 also shows that the anomaly detection system and method of the present invention performs better than a conventional anomaly detection method iForest (Isolation Forest is a model-based method for isolating anomalies).

Exemplary Computer System and Apparatus

Figure 6:
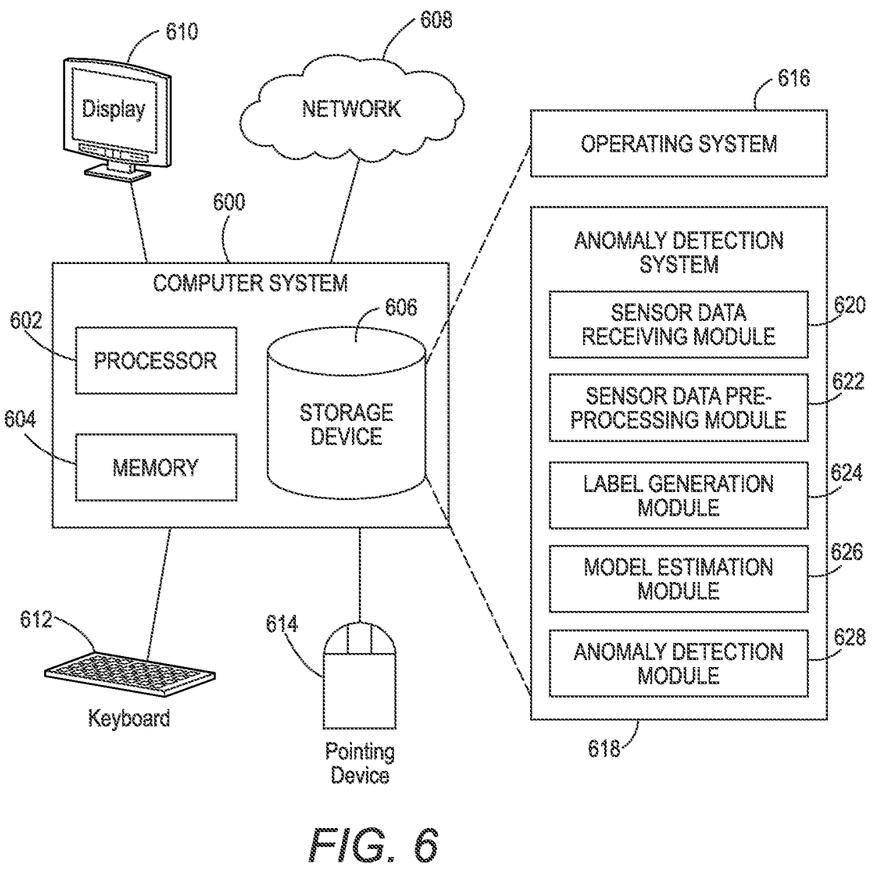
FIG. 6 illustrates an exemplary computer system that facilitates a semi-supervised anomaly-detection system, according to one embodiment of the present invention.

FIG. 6 illustrates an exemplary computer system that facilitates a semi-supervised anomaly-detection system, according to one embodiment of the present invention. In this example, a computer system 600 can include a processor 602, a memory 604, and a storage device 606. Computer system 600 can be coupled to a display device 610, a keyboard 612, and a pointing device 614, and can also be coupled via one or more network interfaces to network 408. Storage device 606 can store an operating system 616, and an anomaly detection system 618.

Anomaly-detection system 618 can include instructions, which when executed by computer system 600 can cause computer system 400 to perform methods and/or processes described in this disclosure. Anomaly detection system 618 can also include instructions for receiving sensor data associated with the one or more sensors (sensor data receiving module 620), instructions for performing sensor data preprocessing (sensor data pre-processing module 622). Furthermore, anomaly detection system 618 can include instructions for generating labels using an ensemble of GMMs (label generation module 624), and instructions for building an ensemble of FNN models (model estimation module 626). Anomaly detection system 618 can further include instructions for detecting anomaly events (anomaly detection module 628).

Figure 7:
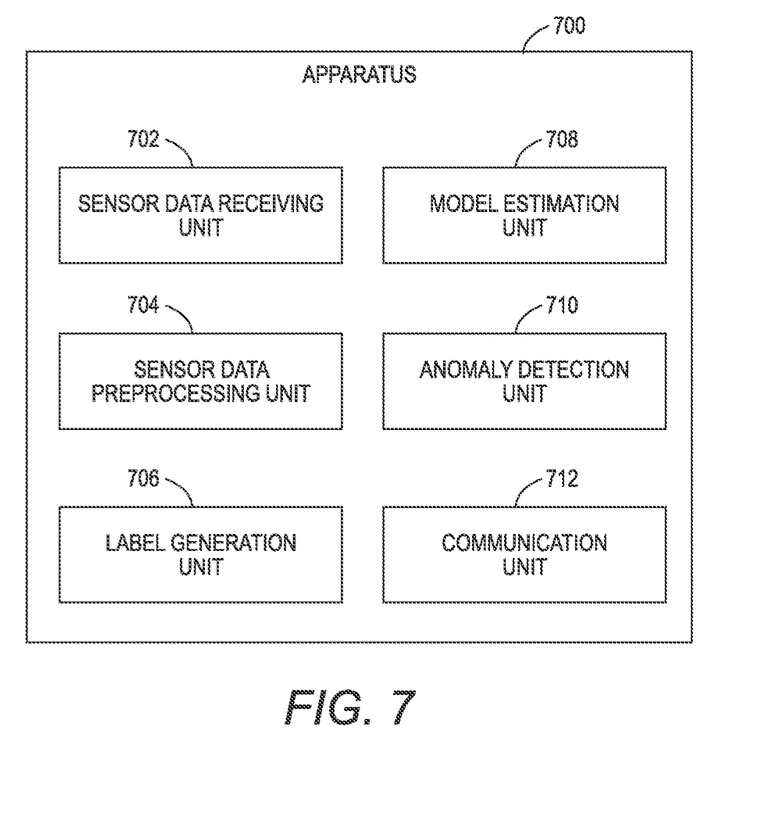
FIG. 7 illustrates an exemplary apparatus that facilitates a semi-supervised anomaly-detection system, according to one embodiment of the present invention.

FIG. 7 illustrates an exemplary apparatus that facilitates a semi-supervised anomaly detection system, according to one embodiment of the present invention. In this example, an apparatus 700 can include a plurality of units or apparatuses that may communicate with one another via a wired or wireless communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can include units 702-712, which perform functions or operations similar to modules 620-628 of computer system 600 of FIG. 6. Apparatus 700 can include: a sensor data receiving unit 702, a sensor data pre-processing unit 704, a label generation unit 706, a model estimation unit 708, and an anomaly detection unit 710. Apparatus 700 can further include a communication unit 712.

In general, embodiments of the present invention provide a method and system to detect anomaly for high-dimensional and unlabeled sensor data using a semi-supervised anomaly detecting with FNN. Detecting anomalies in sensor date associated with factory machines has been used as an example. In practice, this solution is not limited to detecting anomalies associated with factory machines. It can also be used to detect anomalies in other types of equipment or machinery.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting an anomaly in operation of one or more machines, the method comprising:

obtaining a plurality of unlabeled sensor data samples from one or more sensors associated with the one or more machines;

training a plurality of randomly initialized clustering models in parallel using the unlabeled sensor data and user-provided partial label information including a set of normal labels to generate a set of estimated labels, wherein training each randomly initialized clustering model comprises evaluating a reliability of the randomly initialized clustering model, wherein evaluating the reliability of each randomly initialized clustering model comprises computing a weight associated with the randomly initialized clustering model based on a matching rate between estimated labels outputted by the randomly initialized clustering model and user-provided ground-truth labels, and wherein the estimated labels are determined by calculating $$k_* = \arg\max_k \pi_k N(x_* | \mu_k, \Sigma_k),$$

with $x_*$ being the unlabeled sensor data;

computing, for each unlabeled sensor data sample, an abnormal probability based on the estimated labels and the weight associated with each randomly initialized clustering model;

applying a random sample generator to generate multiple sets of labeled training samples based on the abnormal probability;

training a set of feed-forward neural network (FNN) models in parallel, wherein a respective FNN model of the set of trained FNN models is trained using a corresponding set of labeled training samples;

obtaining, for an observed sensor data sample, a set of predicted labels outputted by the set of trained FNN models, wherein each trained FNN model outputs a predicted label;

computing an average of the set of predicted labels outputted by the set of trained FNN models; and determining whether an anomaly is present in the operation of the one or more machines based on whether the average of the set of predicted labels is greater than a user-specified threshold.

2. The method of claim 1, further comprising pre-processing the sensor data samples prior to generating the set of estimated labels.

3. The method of claim 1, wherein each label in the set of estimated labels is:
a normal label; or
an abnormal label.

4. The method of claim 1, wherein at least one randomly initialized clustering model in the plurality of randomly initialized clustering models includes a Gaussian Mixture Model (GMM).

5. The method of claim 1, wherein computing the abnormal probability further comprises computing a weighted average of labels outputted by the plurality of randomly initialized cluttering models, and
wherein applying the random sample generator to generate the multiple sets of labeled training samples further comprises applying a Bernoulli random sample generator to generate the multiple sets of labeled training samples based on the abnormal probability.

6. An apparatus for detecting an anomaly in operation of one or more machines, comprising: one or more processors; a set of sensors embedded in the one or more machines; and memory storing instructions that, when executed by the one or more processors, cause the apparatus to:
obtain a plurality of unlabeled sensor data samples from one or more sensors associated with the one or more machines;
train a plurality of randomly initialized clustering models in parallel using the unlabeled sensor data samples and user-provided partial label information including a set of normal labels to generate a set of estimated labels, wherein
training each randomly initialized clustering model comprises evaluating a reliability of the randomly initialized clustering model, wherein
evaluating the reliability of each randomly initialized clustering model comprises computing a weight associated with the randomly initialized clustering model based on a matching rate between estimated labels outputted by the randomly initialized clustering model and user-provided ground-truth labels, and wherein
the estimated labels are determined by calculating $$k_* = \arg\max_k \pi_k N(x_* | \mu_k, \sum_k),$$

with $x_*$ being the unlabeled sensor data;
computing, for each unlabeled sensor data sample, an abnormal probability based on the estimated labels and the weight associated with each randomly initialized clustering model;
apply a random sample generator to generate multiple sets of labeled training samples based on the abnormal probability;
train a set of feed-forward neural network (FNN) models in parallel, wherein a respective FNN model of the set of trained FNN models is trained using a corresponding set of labeled training samples;
obtain, for an observed sensor data sample, a set of predicted labels outputted by the set of trained FNN models, wherein each trained FNN model outputs a predicted label;
compute an average of the set of predicted labels outputted by the set of trained FNN models; and
determine whether an anomaly is present in the operation of the one or more machines based on whether the average of the set of predicted labels is greater than a user-specified threshold.

7. The apparatus of claim 6, wherein obtaining the sensor data samples further comprises: pre-processing the sensor data samples.

8. The apparatus of claim 6, wherein each label in the set of estimated labels is:
a normal label; or
an abnormal label.

9. The apparatus of claim 6, wherein at least one randomly initialized clustering model in the plurality of randomly initialized clustering models includes a Gaussian Mixture Model (GMM).

10. The apparatus of claim 6, wherein computing the abnormal probability further comprises computing a weighted average of labels outputted by the plurality of randomly initialized cluttering models, and wherein applying the random sample generator to generate the multiple sets of labeled training samples further comprises applying a Bernoulli random sample generator to generate the multiple sets of labeled training samples based on the abnormal probability.

11. A non-transitory computer-readable storage medium storing instructions that when executed by a computer cause the computer to perform a method for detecting an anomaly in operation of one or more machines, the method comprising:
obtaining a plurality of unlabeled sensor data sample from one or more sensors associated with the one or more machines;
training a plurality of randomly initialized clustering models in parallel using the unlabeled sensor data and user-provided partial label information including a set of normal labels to generate a set of estimated labels, wherein
training each randomly initialized clustering model comprises evaluating a reliability of the randomly initialized clustering model, wherein
evaluating the reliability of each randomly initialized clustering model comprises computing a weight associated with the randomly initialized clustering model based on a matching rate between estimated labels outputted by the randomly initialized clustering model and user-provided ground-truth labels, and wherein
the estimated labels are determined by calculating $$k_* = \arg\max_k \pi_k N(x_* | \mu_k, \sum_k),$$

with $x_*$ being the unlabeled sensor data;
computing, for each unlabeled sensor data sample, an abnormal probability based on the estimated labels and the weight associated with each randomly initialized clustering model;
applying a random sample generator to generate multiple sets of labeled training samples based on the plurality of unlabeled sensor data samples and the set of estimated labels;
training a set of feed-forward neural network (FNN) models in parallel, wherein a respective FNN model of the set of trained FNN models is trained using a corresponding set of labeled training samples;

obtaining, for an observed sensor data sample, a set of predicted labels outputted by the set of trained FNN models, wherein each trained FNN model outputs a predicted label;

computing an average of the set of predicted labels outputted by the set of trained FNN models; and determining whether an anomaly is present in the operation of the one or more machines based on whether the average of the set of predicted labels is greater than a user-specified threshold.

12. The non-transitory computer-readable storage medium claim 11, wherein at least one randomly initialized clustering model in the plurality of randomly initialized clustering models includes a Gaussian Mixture Model (GMM).

13. The non-transitory computer-readable storage medium claim 11, wherein each label in the set of estimated labels is one of:

a normal label; and an abnormal label.

14. The non-transitory computer-readable storage medium claim 11, wherein computing the abnormal probability further comprises computing a weighted average of labels outputted by the plurality of randomly initialized cluttering models, and wherein applying the random sample generator to generate the multiple sets of labeled training samples further comprises applying a Bernoulli random sample generator to generate the multiple sets of labeled training samples based on the abnormal probability.

* * * * *

UNITED STATES PATENT AND TRADEMARK OFFICE
CERTIFICATE OF CORRECTION

| | |
|---|---|
| PATENT NO. | : 11,741,341 B2 |
| APPLICATION NO. | : 16/593248 |
| DATED | : August 29, 2023 |
| INVENTOR(S) | : Deokwoo Jung |

It is certified that error appears in the above-identified patent and that said Letters Patent is hereby corrected as shown below:

On the Title Page

Item (73) Assignee: "Palo Alto Research Center Incorporated, Palt Alto, CA (US)" Should Read "Xerox Corporation, Norwalk, CT (US)"

Signed and Sealed this
Seventh Day of November, 2023

Katherine Kelly Vidal
*Director of the United States Patent and Trademark Office*